No. 794,120. PATENTED JULY 4, 1905.
G. W. RITTERSBACH.
COUPLING FOR LOCOMOTIVE ENGINES AND TENDERS.
APPLICATION FILED SEPT. 14, 1904.
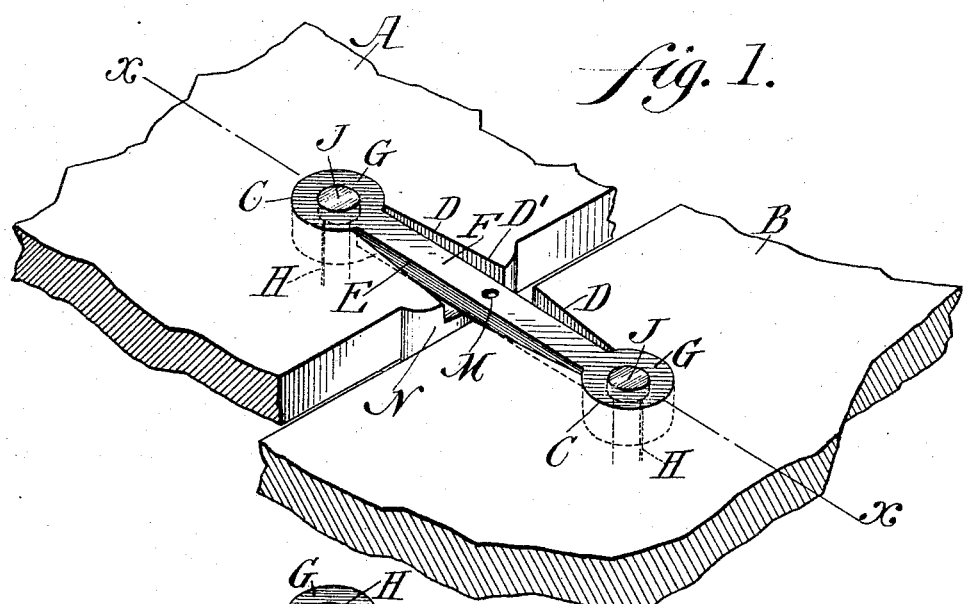
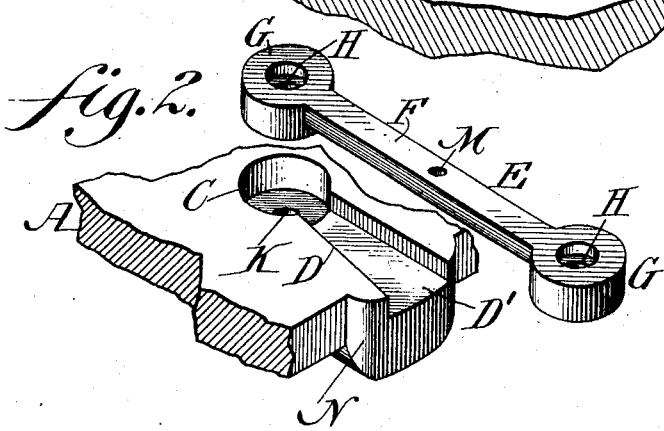
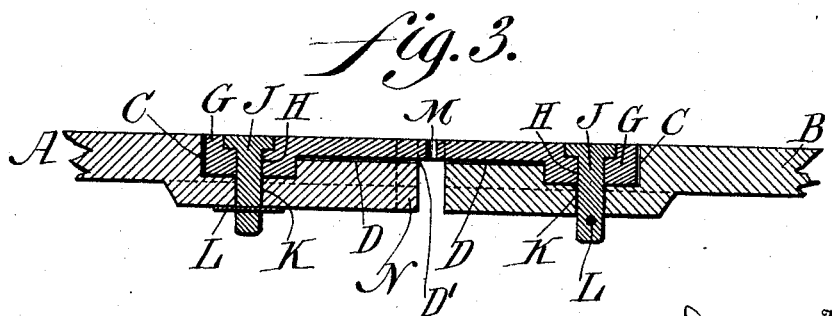
Witnesses
L. Houville,
O. F. Nagle.
Inventor.
George W. Rittersbach
By Diederichs & Fairbanks
Attorneys.

No. 794,120. Patented July 4, 1905.

UNITED STATES PATENT OFFICE.

GEORGE W. RITTERSBACH, OF PHILADELPHIA, PENNSYLVANIA, ASSIGNOR OF ONE-FOURTH TO JACOB F. GAEHRING AND ONE-EIGHTH TO ROBERT B. RITTERSBACH, OF PHILADELPHIA, PENNSYLVANIA.

COUPLING FOR LOCOMOTIVE ENGINES AND TENDERS.

SPECIFICATION forming part of Letters Patent No. 794,120, dated July 4, 1905.

Application filed September 14, 1904. Serial No. 224,374.

*To all whom it may concern:*

Be it known that I, GEORGE W. RITTERSBACH, a citizen of the United States, residing in the city and county of Philadelphia, State of Pennsylvania, have invented a new and useful Coupling for Locomotive Engines and Tenders, of which the following is a specification.

My invention relates to an improvement in couplings for locomotive engines and tenders; and it consists of a coupling formed of a bar having circular heads or ends, which latter are adapted to be seated in circular recesses in the foot-board and tender-plates and rotate therein, the body of the bar being adapted to occupy recesses in said plates and play therein during the swaying of the engine and tender, and other details are presented, as will be hereinafter described, the novel features being pointed out in the claims.

Figure 1 represents a perspective view of a coupling embodying my invention. Fig. 2 represents a perspective view of portions of the same in separate condition. Fig. 3 represents a longitudinal section on line $x\,x$, Fig. 1.

Similar letters of reference indicate corresponding parts in the figures.

Referring to the drawings, A designates a portion of a foot-board plate of a locomotive engine, and B designates a portion of a tender-plate. In the upper faces of said plates are the circular recesses C and the flaring recesses D, the latter being continuous of said recesses C and terminating at the ends of said plates, the recesses D D extending in the longitudinal direction of the plates and radiating from the recesses C C.

E designates a coupling for the engine and tender, the same consisting of the bar F and the circular heads G on the ends thereof, said heads having eyes or openings H therein to receive the coupling pins or bolts J, which pass, respectively, through openings K in the plates A B at the bases of the recesses C, the bolts having their heads flush with the plates A B and their lower ends provided with keys or pins L to prevent rising and displacement thereof.

It will be seen that while the coupling readily yields to the swaying and lateral motions of the engine and tender it retains its position in the plates A B, thus reliably connecting or coupling the engine and tender. When uncoupling or disconnection is to be effected, the pins L are withdrawn and the bolts J raised, whereby the coupling E may be removed from the plates A B, the effect of which is evident.

To assist in removing the coupling, the bar F is provided with an opening M for the insertion of an implement or device serving as a handle.

As the coupling is flush with the plates A B, the usual apron may be placed over the same without interfering with the motions and operations of the coupling, said apron covering the coupling and the space between the two plates.

N designates the buffer of the foot-board plate of the engine, the same having a longitudinally-extending recess D' continuous of the recess D, so that the bar of the coupling will be additionally supported by the buffer, and said recess D', continuing the flare of the recess D, will permit greater side oscillations of the bar without affecting the action of the coupling or the strength of the parts involved.

Various changes may be made in the details of construction shown without departing from the general spirit of my invention, and I do not, therefore, desire to be limited in each case to the same.

Having thus described my invention, what I claim as new, and desire to secure by Letters Patent, is—

1. In a coupling of the character stated, a plate having therein a circular recess, a longitudinally-extending recess radiating therefrom toward the end of the plate, and a coupling composed of a bar and a circular head at the end thereof respectively occupying said recesses, said head having an eye adapted to communicate with an eye in said plate and a bolt adapted to occupy said eyes.

2. In a coupling of the character stated, a plate having therein a circular recess, a longitudinally-extending recess radiating therefrom toward the end of the plate, and a coupling composed of a bar and a circular head at the end thereof respectively occupying said recesses, said head having an eye adapted to communicate with an eye in said plate and a bolt adapted to occupy said eyes, the head of said bolt and upper face of said bar and eye being flush.

3. In a coupling of the character stated, a plate having communicating circular and radiating recesses therein, and a buffer having a recess continuous of the radiating recess.

GEORGE W. RITTERSBACH.

Witnesses:
JOHN A. WIEDERSHEIM,
WM. CANER WIEDERSEIM.